JOHN GRAY.
Machine for Wrapping Wire Cables.
No. 122,246. Patented Dec. 26, 1871.
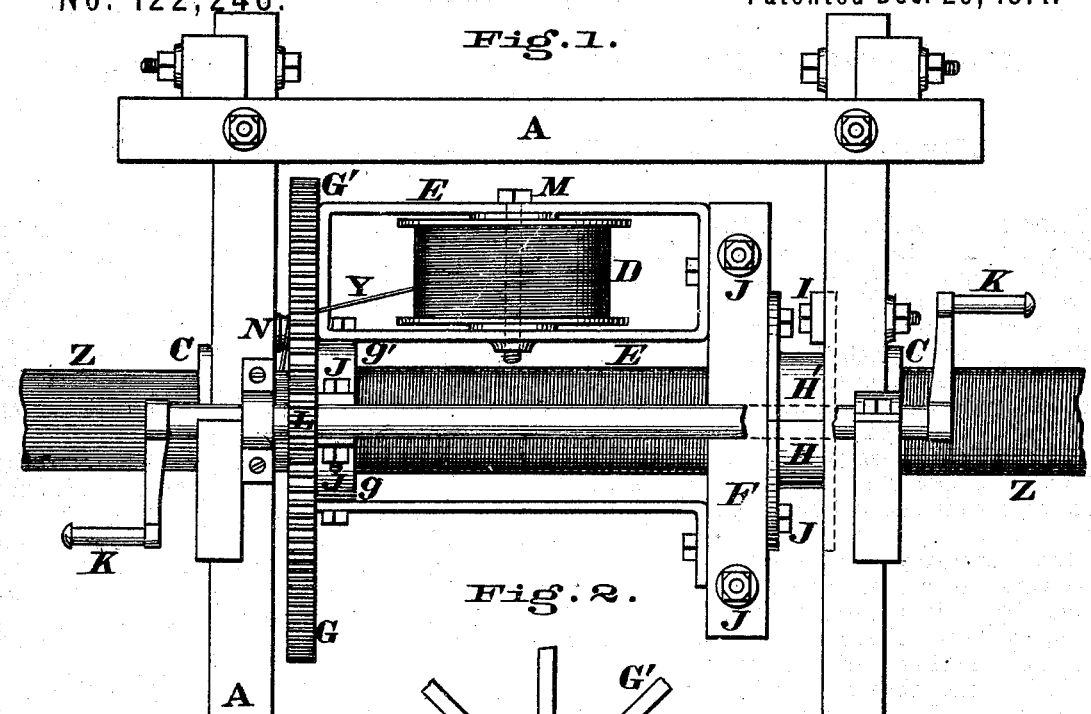
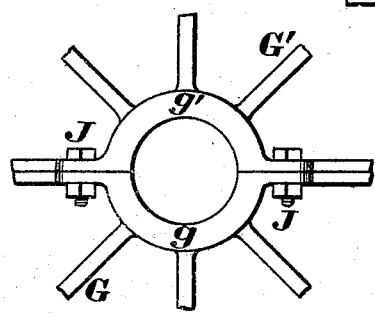
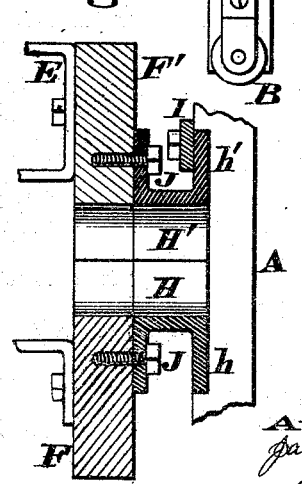
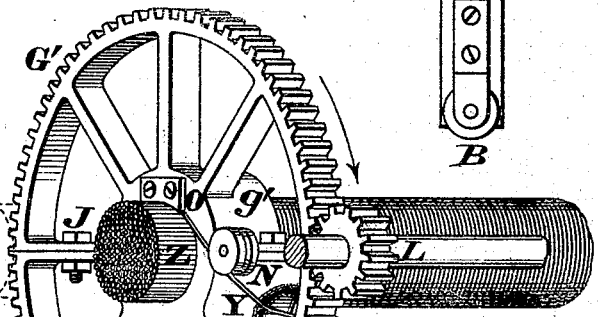
Attest: Jas. H. Layman, John Kiloh
John Gray, INVENTOR

UNITED STATES PATENT OFFICE.

JOHN GRAY, OF CINCINNATI, OHIO.

IMPROVEMENT IN MACHINES FOR WRAPPING WIRE-CABLES.

Specification forming part of Letters Patent No. 122,246, dated December 26, 1871.

I, JOHN GRAY, of Cincinnati, Hamilton county, Ohio, have invented a new and useful Machine for Wrapping Wire-Cables, of which the following is a specification:

This is an improved device for wrapping the bundles of wires of which wire-cables of suspension-bridges are composed; and comprises a traveling-frame, having journaled within it a reel or spool wholly external to the cable, and readily withdrawn when empty and replaced by a full one. It further comprises a provision for regulating the tension of the wrapping-wire, and other devices.

In the accompanying drawing, Figure 1 is a side elevation of a machine embodying my invention. Fig. 2 is a rear elevation of a portion of the spur-wheel. Fig. 3 is a perspective view of the same wheel and its accessories. Fig. 4 is a vertical section through the head-block and driving collar. Fig. 5 is a front elevation of a portion of the bar and flange, which connect the revolving with the main frame.

A is a frame, adapted to be put together over and about the bundles of wires composing the cable Z. This frame has casters B, to enable it to travel on and be supported by a suitable platform about twelve feet in length, and having bails at or near its ends, by which it is suspended from the cable.

This suspended platform, constituting no part of my invention, is omitted from the present illustration.

The frame A with its contained mechanism is caused to travel along the cable, in the manner to be presently described, and is confined to and guided along said cable by boxes C attached to and forming part of said frame. The reel or spool D, which carries the wrapping-wire Y, is wholly external to the cable, being journaled in frame E, which is bolted at one end to head-block F F', and at its other end to the hub $g\ g'$ of spur-wheel G G'. The head-block F F' has bolted to its rear side a collar, H H', having a rear flange, $h\ h'$, which, engaging behind a bar, I, attached to the main frame A, obliges the latter to travel forward with the revolving spool, frame, or holder. The head-block F F', collar H $h$ H' $h'$, and spur-wheel G $g$ G' $g'$, constituting the revolving spool-holder, are all separable in two equal parts, secured by bolts J to enable them to be built around the cable in the manner shown, and afterwards to be removed therefrom. The reel-frame and its described appendages are rotated about the cable, as an axis, by winch K, whose pinion L gears into spur-wheel G $g$ G' $g'$, said winch being for that purpose journaled in the frame at a convenient height above the platform. Through the spool-frame proper E and spool D passes a clamp-screw, M, about which the spool freely revolves, and by means of which a pressure may be created on the ends of the spool, so as to impose more or less tension on the wire as it passes out into the cable.

The spool is filled with wire before it is put into the machine, and when emptied it is removed and another full spool put in its place. This is done in a minute or two by simply taking out the clamp-screw. As the spool-frame with its attachments revolves, the wire passes from the spool E through the large wheel G G' around a paying-out sheave, N, to the cable. A steel guide-plate, O, attached to the wheel G G', serves to press the strand of wire as it is put on tightly against the folds or courses of wire already laid, so as to completely cover the cable. The entire machine is made to travel slowly forward the thickness of a strand at each revolution of the spool-frame by the pressure of the guide-plate O against the last laid strand.

The right is reserved to vary the details of construction in non-essential particulars, for example, a second winch (see dotted lines in Fig. 3) may be added.

Claims.

I claim herein as new, and of my invention.

1. In the described combination with a main frame, A, supported on casters B, and having an operating-winch, K, the revolving spool E exterior to the cable, journaled in the revolving and separable frame F F' H $h$ H' $h'$, G $g$ G' $g'$ J, or their mechanical equivalents.

2. In combination with the elements of the claim next preceding, the pressure and guide-plate O, for the purposes set forth.

In testimony of which invention I hereunto set my hand.

JOHN GRAY.

Witnesses:
 GEO. H. KNIGHT,
 JAMES H. LAYMAN.

(17)